Patented Aug. 25, 1936

2,052,374

UNITED STATES PATENT OFFICE 2,052,374

PROCESS FOR PRODUCING WATER-SOL-UBLE AND WATER-MISCIBLE INSEC-TICIDES AND PRODUCTS PRODUCED THEREBY

Robert Wotherspoon, East Orange, N. J., assignor to Derris, Inc., New York, N. Y., a corporation of New York No Drawing. Application April 28, 1934, Serial No. 722,969

12 Claims. (Cl. 167—24)

My invention relates to insecticides and refers to processes for the production of dry insecticides obtained from vegetable sources, and their hydrogenated compounds, in an aqueous-soluble, or advantageously aqueous-miscible condition, when mixed or not mixed, with a wetting agent.

The active principles of Derris (Deguelia) sp. (tuba root) and Lonchocarpus nicou (cube root) consist of a mixture of rotenone, deguelin, tephrosin, toxicarol and several other chemical bodies of lesser insecticidal value.

Several other plant materials such as the roots of the genus Spatholobus contain one or more of the above mentioned constituents.

These active principles are soluble in a great many organic solvents such as ethyl acetate, benzoyle, acetone, chloroform, ethylene dichloride, safrol, et cetera.

These solutions of active principles may be subjected to the action of hydrogen in the presence of an active catalyst, such as nickel, to form a dihydro-rotenone and hydrogenated products of the other principles, which have not as yet been identified. These hydrogenated products are more stable to light and air than the original material and no doubt will be of great commercial value.

Concentrated horticultural insecticides containing the above mentioned principles are usually prepared from a concentrated organic solvent solution of derris or cube such as acetone, ethylene, dichloride, safrol, et cetera, with or without a spreading agent, and with or without other insecticidal principles such as pyrethrum, et cetera.

Other uses have been found for these insecticidal principles. They are now being used in preparation of mange remedies, insecticidal soaps, body lice preparations, et cetera.

There is a demand for powdered or dry derris or cube insecticides containing the necessary amount of wetting agents; i. e. soap, et cetera that are water soluble or water miscible.

It is difficult to prepare a satisfactory product of this type chiefly for two reasons:—

1. The derris or cube dried extracts are not water soluble; in fact, they, like most resins, are water resistant. Soap and similar agents used for wetting purposes while reducing the water resisting property are not sufficiently powerful in their action to disperse the particles of rotenone, dihydrorotenone, deguelin, toxicarol, tephrosin (or derris resins) to obtain the maximum insecticidal value from a given amount of insecticide.

2. The incorporation of these insecticides in the soap during the process of manufacture has been suggested, but unfortunately due to the instability of rotenone in presence of alkali, serious reduction in strength of the insecticide results during the evaporation of the water.

I have found that if rotenone, dihydrorotenone, finely ground derris or cube', solid extracts of derris or cube', the hydrogenated derivatives of same, either alone or in mixtures, are melted or intimately mixed with a solid water-soluble phenol containing two or more hydroxyl groups, the resulting product after cooling and grinding is soluble, or miscible, with water in any proportions.

The products thus produced may be mixed, if desired, with any powdered materials which act as wetting agents, such as soap, alkali salts of sulphonated hydrocarbons or alcohols, sulphonated oils, et cetera.

Fillers such as starch, glue, gums, dextrins, flour, clays, talc, bentonite, chalk, diatomaceous earth, et cetera may also be incorporated therein if desired.

The maximum results are obtained with these insecticides when treated in this manner.

The phenols referred to above may be one or more of the dihydric phenols such as catechol, resorcinol and quinol and their homologues, and the trihydric phenols such as pyrogollol, phloroglucinol and hydroxyquinol and their homologues.

When sufficient amounts of one, or more, of these phenols are incorporated in this manner, the resulting product is soluble in water in any proportions. If insufficient amounts are incorporated the resulting product gives a milky mixture when added to water. This highly emulsified product is very active as an insecticide, as it appears to be suspended in the water in a colloidal state.

*Example 1*

12.5 parts by weight of rotenone are mixed with 87.5 parts by weight of resorcinol in a vessel equipped with a heating arrangement.

Heat is applied and when melted the contents are withdrawn and allowed to cool. The product is then ground in a suitable grinding mill. This material is miscible with water in all proportions and when so mixed is highly toxic to most insects.

*Example 2*

12½ parts by weight of dry hydrogenated derris extract are melted with 43.75 parts by weight of resorcinol. The cooled product is ground to a fine powder and mixed with 50 parts by weight of powdered soap.

The resulting product when mixed with water is quickly dispersed and yields a most satisfactory horticultural spray.

Example 3

10 parts by weight of dihydrorotenone are melted with 90 parts by weight of pyrogallol.

The resulting product when ground and dissolved in water yields a valuable insecticide that may be used for mothproofing woolen materials.

It is apparent that the addition of these phenols gives to the insecticides additional properties such as fungicidal and germicidal.

I have found that a finely ground intimate mixture of the dry insecticide and a phenolic compound will allow of the solution of the two ingredients in water, but I prefer to dissolve the insecticide in the phenolic compound by means of heat as indicated in the examples.

The employment of a sufficient quantity of the phenolic compound will produce a product which is completely soluble in water, while the employment of a smaller quantity will produce a product which, while not completely soluble, is miscible in water to an extent not previously possible of production, and which, therefore, has superior insecticidal strength and by the words "aqueous disseminatable" in my claims, I include both the soluble and miscible condition of the insecticide.

By "insecticides" in my specification and claims, I mean rotenone, dihydrorotenone, finely ground derris or cube', solid extracts of derris or cube', and the hydrogenated derivatives of same, either alone or in mixtures.

I do not limit myself to the particular products, times, temperatures, quantities, or steps of procedure specifically mentioned as these are given simply as a means for clearly describing my invention.

What I claim is:—

1. An aqueous-disseminatable composition of matter consisting of an insecticide obtainable from derris and similar insecticidal-containing plant materials containing rotenone, deguelin, tephrosin and toxicarol and a water-soluble phenol containing at least two hydroxyl groups.

2. An aqueous-disseminatable composition of matter consisting of an insecticide obtainable from derris and similar insecticidal-containing plant materials containing rotenone, deguelin, tephrosin and toxicarol and resorcine.

3. A homogenous solidified aqueous-disseminatable composition of matter consisting of an insecticide obtainable from derris and similar insecticidal-containing plant materials containing rotenone, deguelin, tephrosin and toxicarol and a water-soluble phenol containing at least two hydroxyl groups.

4. A homogenous solidified aqueous-disseminatable composition of matter consisting of an insecticide obtainable from derris and similar insecticidal-containing plant materials containing rotenone, deguelin, tephrosin and toxicarol and resorcine.

5. An aqueous-disseminatable composition of matter consisting of a hydrogenated insecticide obtainable from the group consisting of plant material containing rotenone, deguelin, tephrosin and toxicarol and resorcine.

6. An aqueous-disseminatable composition of matter consisting of a hydrogenated insecticide obtainable from the group consisting of plant material containing rotenone, deguelin, tephrosin and toxicarol and a water-soluble phenol containing at least two hydroxyl groups.

7. A homogenous solidified aqueous-disseminatable composition of matter consisting of a hydrogenated insecticide obtainable from the group consisting of plant material containing rotenone, deguelin, tephrosin and toxicarol and a water-soluble phenol containing at least two hydroxyl groups.

8. A homogeneous solidified aqueous-disseminatable composition of matter consisting of a hydrogenated insecticide obtainable from the group consisting of plant material containing rotenone, deguelin, tephrosin and toxicarol and resorcine.

9. A process for the production of aqueous-disseminatable insecticides, which consists in melting an insecticide obtainable from the group consisting of plant materials containing rotenone, deguelin, tephrosin and toxicarol in a water-soluble phenol containing at least two hydroxyl groups.

10. A process for the production of aqueous-disseminatable insecticides which consists in melting an insecticide obtainable from the group consisting of plant materials containing rotenone, deguelin, tephrosin and toxicarol in resorcine.

11. A process for the production of aqueous-disseminatable insecticides which consists in melting a hydrogenated insecticide obtainable from the group consisting of plant materials containing rotenone, deguelin, tephrosin and toxicarol in a water-soluble phenol containing at least two hydroxyl groups.

12. A process for the production of aqueous-disseminatable insecticides, which consists in melting a hydrogenated insecticide obtainable from the group consisting of plant materials containing rotenone, deguelin, tephrosin and toxicarol in resorcine.

ROBERT WOTHERSPOON.